United States Patent
Iland et al.

(10) Patent No.: US 10,681,120 B2
(45) Date of Patent: Jun. 9, 2020

(54) LOAD BALANCING STICKY SESSION ROUTING

(71) Applicant: Uber Technologies, Inc., San Francisco, CA (US)

(72) Inventors: Daniel Iland, Oakland, CA (US); Venkata Sathya Praveen Gorthy, Pleasanton, CA (US); Andrew Irish, Mountain View, CA (US)

(73) Assignee: Uber Technologies, Inc., San Francisco, CA (US)

( * ) Notice: Subject to any disclaimer, the term of this patent is extended or adjusted under 35 U.S.C. 154(b) by 106 days.

(21) Appl. No.: 16/045,665

(22) Filed: Jul. 25, 2018

(65) Prior Publication Data

US 2019/0037014 A1    Jan. 31, 2019

Related U.S. Application Data

(60) Provisional application No. 62/536,882, filed on Jul. 25, 2017.

(51) Int. Cl.

| | |
|---|---|
| *G06F 15/173* | (2006.01) |
| *H04L 29/08* | (2006.01) |
| *H04L 12/743* | (2013.01) |
| *G06F 16/29* | (2019.01) |
| *H04L 12/18* | (2006.01) |
| *G01C 21/32* | (2006.01) |

(52) U.S. Cl.
CPC .......... *H04L 67/1027* (2013.01); *G06F 16/29* (2019.01); *H04L 12/1895* (2013.01); *H04L 45/7453* (2013.01); *H04L 67/1021* (2013.01); *H04L 67/141* (2013.01); *H04L 67/18* (2013.01); *H04L 67/28* (2013.01); *G01C 21/32* (2013.01)

(58) Field of Classification Search
CPC ... H04L 67/1027; H04L 67/141; H04L 67/18; H04L 67/28; H04L 45/7453; H04L 12/1895; H04L 67/1029; H04L 67/1034; H04L 67/1036; H04L 67/1038; H04L 67/1008; G06F 16/29; G06F 11/3433
USPC ................................ 709/227, 203, 204, 217
See application file for complete search history.

(56) References Cited

U.S. PATENT DOCUMENTS

| | | | | |
|---|---|---|---|---|
| 6,185,623 B1 * | 2/2001 | Bailey | .................. | H04L 12/185 709/220 |
| 6,856,991 B1 * | 2/2005 | Srivastava | ........ | H04L 29/12066 |
| 7,047,315 B1 * | 5/2006 | Srivastava | .............. | H04L 45/50 370/236 |
| 7,088,718 B1 * | 8/2006 | Srivastava | .............. | H04L 45/00 370/392 |

(Continued)

*Primary Examiner* — Thu Ha T Nguyen
(74) *Attorney, Agent, or Firm* — Fenwick & West LLP (57) ABSTRACT

An intermediary node receives broadcasts from servers each indicating three-dimensional map tiles loaded into the server's memory using geohashes. The intermediary node updates a set of ordered lists of server identifiers based on the geohashes. The intermediary node receives a request a client device including location information and a client identifier. The intermediary node generates a client geohash based on the location information. The intermediary node identifies an ordered list using the client geohash. The intermediary node selects a server identifier from the identified ordered list based on the client identifier. The intermediary node initiates a network connection between the client and the selected server.

20 Claims, 5 Drawing Sheets

(56) References Cited

U.S. PATENT DOCUMENTS

| | | | |
|---|---|---|---|
| 7,512,702 B1* | 3/2009 | Srivastava | H04L 45/00 370/236 |
| 7,634,477 B2* | 12/2009 | Hinshaw | G06F 16/273 |
| 9,584,834 B1* | 2/2017 | Bush | H04N 21/266 |
| 2007/0183404 A1* | 8/2007 | Hofer | H04L 45/04 370/352 |
| 2007/0220123 A1* | 9/2007 | Agrawal | G06Q 10/063112 709/223 |
| 2007/0250901 A1* | 10/2007 | McIntire | H04N 7/17318 725/146 |
| 2009/0089078 A1* | 4/2009 | Bursey | H04W 4/70 705/300 |
| 2010/0146057 A1* | 6/2010 | Abu-Hakima | H04L 12/1859 709/206 |
| 2010/0199188 A1* | 8/2010 | Abu-Hakima | H04L 12/1895 715/733 |
| 2011/0291881 A1 | 12/2011 | Shirai | |
| 2012/0179797 A1* | 7/2012 | Sharma | H04L 41/0806 709/223 |
| 2012/0190325 A1* | 7/2012 | Abu-Hakima | H04W 4/90 455/404.2 |
| 2012/0190369 A1 | 7/2012 | Gao et al. | |
| 2012/0278844 A1* | 11/2012 | Curtis | H04N 21/4147 725/93 |
| 2013/0214909 A1* | 8/2013 | Meijers | H04W 4/029 340/10.5 |
| 2013/0217333 A1* | 8/2013 | Sprigg | G06Q 30/0207 455/41.2 |
| 2013/0265191 A1 | 10/2013 | Ghinamo | |
| 2014/0304756 A1* | 10/2014 | Fletcher | H04N 21/2625 725/115 |
| 2014/0370879 A1* | 12/2014 | Redding | H04M 3/42178 455/419 |
| 2015/0070383 A1* | 3/2015 | Da Veiga | G06T 15/08 345/629 |
| 2016/0203522 A1* | 7/2016 | Shiffert | H04W 76/14 705/14.58 |
| 2016/0260048 A1* | 9/2016 | Uerbach | G06F 16/951 |
| 2016/0337426 A1* | 11/2016 | Shribman | H04L 65/4084 |
| 2016/0349362 A1* | 12/2016 | Rohr | G01S 13/86 |
| 2017/0006113 A1* | 1/2017 | Singhal | H04L 67/141 |
| 2017/0023659 A1 | 1/2017 | Bruemmer et al. | |
| 2017/0091291 A1* | 3/2017 | Bostick | G06F 16/248 |
| 2017/0353880 A1* | 12/2017 | Gerlach | H04W 4/021 |
| 2018/0018572 A1 | 1/2018 | Wang | G06Q 10/04 |
| 2018/0081514 A1* | 3/2018 | Bostick | G06F 21/84 |
| 2018/0361235 A1* | 12/2018 | Hunter | H04L 67/1095 |
| 2019/0037014 A1* | 1/2019 | Iland | G06F 16/29 |
| 2019/0098443 A1* | 3/2019 | DeLuca | H04W 4/021 |
| 2019/0116230 A1* | 4/2019 | Schwab | H04L 67/18 |
| 2019/0228088 A1* | 7/2019 | Ammanamanchi | G06F 16/29 |
| 2019/0297129 A1* | 9/2019 | Fletcher | H04N 21/2225 |

* cited by examiner

LOAD BALANCING STICKY SESSION ROUTING

CROSS REFERENCE TO RELATED APPLICATIONS

This application claims the benefit of U.S. Provisional Application No. 62/536,882, filed Jul. 25, 2017, which is incorporated by reference herein.

TECHNICAL FIELD

The present disclosure relates in general to computer networks and in particular to processing connection requests.

BACKGROUND

Client devices connect to servers via computer networks, such as the Internet, over which the client devices and servers exchange information. Computer networks include network nodes that forward information from one data link to another, e.g. nodes that receive information from a client device and forward it to a server, and vice versa. Network nodes (some of which are routing nodes) may be connected to many data links, and use techniques such as a routing table to determine which data link to forward information to. Sometimes a client device and a server create a persistent connection with one another over the computer network, called a sticky session.

Both servers and client devices include limited active memory space. For example, a server or client device is outfitted with a particular amount of random access memory (RAM) with a particular capacity to store information. When active memory is at full capacity, information loaded into the active memory is removed from the active memory to create space for additional information. For example, the additional information is loaded by overwriting information previously loaded within the active memory, removing the previously loaded information from active memory. This renders the previously loaded information unavailable for use until a time when it is again loaded into active memory.

Execution of a program sometimes involves a client device and a server exchanging information over a network, e.g. where a client device obtains a measurement and sends the obtained measurement to the server, which processes the measurement to generate some output, and then sends the output to the client device for use.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Large scale processing tasks that involve significant computational performance and memory space, such as fusing three-dimensional (3D) map data with ray traces and particle filter data to generate a location estimate, can use multiple servers 120 to handle different aspects of the task. For example, different servers 120 can maintain in memory 3D map data for different geographic areas, where each server 120 handles tasks for clients 110 related to the 3D map data maintained in memory by the server 120. However, identifying the appropriate server 120 to connect to a client 110, e.g. the server 120 with 3D map data relevant to the client 110, can be challenging. For example, the information servers 120 keep in memory may frequently change, and clients 110 may therefore not know which particular server 120 to request information from. Determining which server 120 to request information from can cause significant latency for a client 110, which may lessen its ability to execute its various functions. Furthermore, poor load balancing among a collection of servers 120 serving clients 110 can cause slow or dropped connections or so on. Additionally, downed servers 120 can exacerbate issues such as server 120 overload or latency.

As described herein, an intermediary node 135 using a sticky session routing layer overcomes the above challenges while providing load balancing among the servers 120, minimizing communication latency between client 110 and server 120, and minimizing disruption due to downed servers 120.

Figure 1:
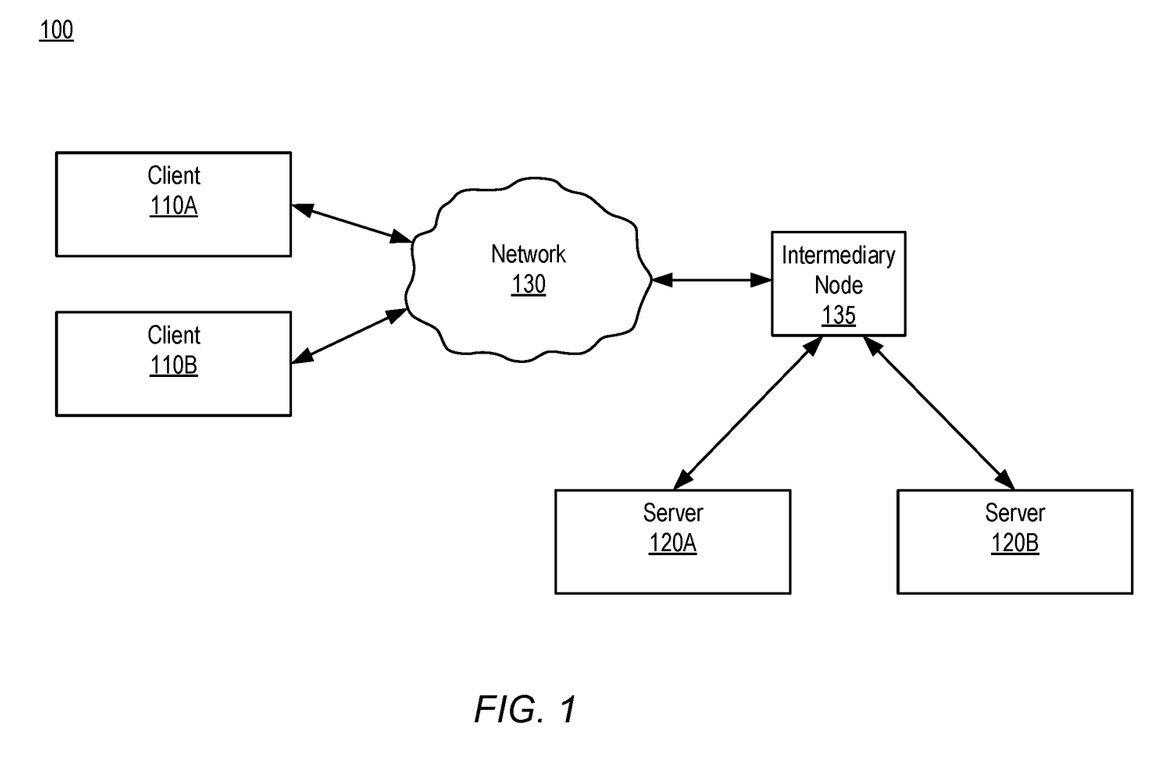
FIG. 1 is a block diagram illustrating a network system according to one embodiment.

FIG. 1 is a block diagram illustrating a network system 100 according to one embodiment. The network system 100 includes two client devices 110 and two servers 120 connected by a network 130 that includes an intermediary node 135. In other embodiments, the location estimation system 100 may include fewer, other, or additional components. For example, the location estimation system 100 could alternatively include a single client 110, or more than two servers 120.

FIG. 1 uses like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral. For example, "110" in the text refers to reference numerals "110A" and/or "110B" in the figures.

A client 110 is an electronic device used to perform functions such as executing software applications for various purposes. For example, the client 110 may be used by a user for communication with users of other clients, or for navigation using a mapping application. Alternatively, the client 110 may be used for semi-autonomous or autonomous tasks without direct use by a user, such as navigation by a self-driving car. In some embodiments, the client 110 is a computing device such as a laptop, tablet, or smartphone. In other embodiments, the client 110 is a vehicle including a computing component, such as a car that has a computer system. As used herein, "client" is interchangeable with "client device." Clients are described in greater detail below with reference to FIG. 2.

Each server 120 is an electronic device used to perform functions such as executing software applications for various purposes. Clients 110 may open communication channels to connect with servers 120 over the network 130, or vice versa. For example, a server 120 may store information that a client 110 does not store locally. Therefore the client 110 may create a connection with the server 120 over a network connecting the two and use the connection to request the information, which the server 120 duly sends to the client 110 via the network connection. The intermediary node 135 can control the connection such that the client 110 connects with a particular server 120, e.g. server 120A rather than server 120B, or vice versa, as described below with reference to FIG. 3. In some embodiments, the intermediary node 135 initiates the connection between client 110 and server 120.

Network 130 enables communications among the clients 110 and the servers 120 and can include the Internet as well as mobile telephone networks. In one embodiment, the network 130 uses standard communications technologies and/or protocols. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. The messages exchanged by the clients 110 can also be encrypted. The entities can use custom and/or dedicated data communications technologies instead of, or in addition to, the ones described above.

The network 130 further includes an intermediary node 135 that implements a sticky session routing layer, as described below with reference to FIG. 3. The intermediary node 135 is a routing node that mediates communications to and from the clients 110 and servers 120. The network 130 may include other routing or network nodes through which information, e.g. packets, may pass before or after reaching the intermediary node 135. The intermediary node 135 may route communications from clients 110 to particular servers 120 based on the substance of the communications. For example, depending upon the content of a communication from client 110A, the intermediary node 135 may initiate a connection between client 110A and either server 120A or server 120B, as described below with reference to FIG. 3.

Clients and Servers

Figure 2:
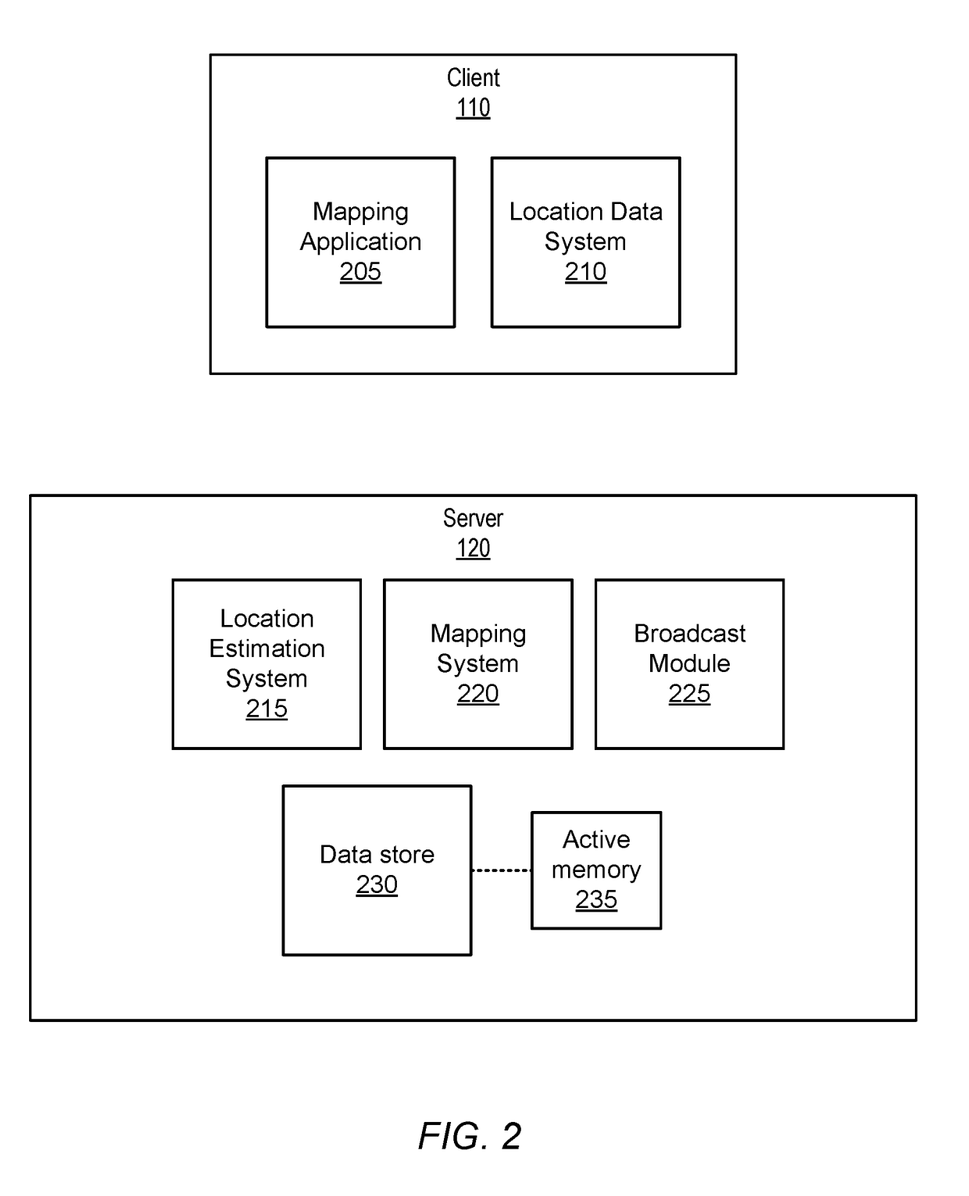
FIG. 2 is a block diagram of a client and a server, according to one embodiment.

FIG. 2 is a block diagram of a client 110 and a server 120, according to one embodiment. Both clients 110 and servers 120 are nodes of the network 130, which is used by clients 110 and servers 120 to exchange information.

The client 110 includes a mapping application 205 and a location data system 210. In other embodiments the client 110 may include fewer, alternative, or additional components. In various embodiments, the client 110 may be identified by a client identifier, or by a user identifier identifying a user of the client 110 or of an application upon the client 110, such as the mapping application 205. For example, the client 110 may be identified by a user identifier of a user account that is signed into the mapping application 205. For simplicity, the present disclosure refers to both user identifiers and client identifiers as client identifiers, which may be alphanumeric strings.

The mapping application 205 uses location estimates for localization and tracking. Depending upon the embodiment, the mapping application 205 may be a navigation system that uses location estimates to generate a route from a current location of the client 110 to a destination location, or may be a vehicular navigation system that uses location estimates to inform autonomous or semi-autonomous vehicular navigation, e.g. in conjunction with computer vision or the like. In some embodiments, the mapping application 205 uses location estimates generated by the server 120 using location data generated by the location data system 210. For example, the mapping application 205 may use location estimates received by the client 110 over the network 130 from one or more servers 120.

The location data system 210 obtains location data, such as various sensor output from sensors communicatively connected to the location data system 210. For example, the location data system 210 may be connected to an inertial measurement unit (IMU) of the client 110, which tracks motion using accelerometers, gyroscopes, magnetometers, or the like. The location data system 210 may also be connected to a global navigation satellite system (GNSS) receiver of the client 110, which receives location information from various GNSS satellites, which may be a part of various satellite constellations such as Global Positioning System (GPS), GLONASS, Galileo, or BeiDou. The location data system 210 may send location data to one or more servers 120 over the network 130.

The server 120 includes a location estimation system 215, a mapping system 220, a broadcast module 225, a data store 230, and active memory 235. Each server 120 may be identified by a server identifier, e.g. an alphanumeric string. The location estimation system 215 generates location estimates based on location information. For example, the location estimation system 215 may generate a location estimate based on location information received from the client 110 using a particle filter. The location estimation system 215 may additionally use information stored in the server 120 to improve the location estimate. For example, the location estimation system 215 may fuse the particle filter data with information from the mapping system 220 to generate a composite location estimate.

In an embodiment, the location estimation system 215 maintains state information for each client 110 for which the location estimation system 215 generates location estimates. For example, the location estimation system 215 stores the state information in the data store 230 and/or in active memory 235. The location estimation system 215 factors the state information, e.g. previous particle distributions, into subsequent location estimates (e.g., distributions of particles estimating location) using the particle filter. If the client 110 were to connect to a different server 120, the state information would likely not be usable for the different server's particle filter 120. As such, the network connection between the client 110 and the server 120, once established, is a sticky session, i.e. a persistent connection. However, as detailed below, a sticky session may be terminated by the server 120, e.g. in response to receipt of a request from the intermediary node 135.

The mapping system 220 generates ray traces based on GNSS data included in the received location information, and uses 3D map data held in active memory 235 to perform shadow matching with the ray traces. The 3D map data is logically organized into 3D map tiles each representing a different geographic area, which may or may not overlap depending upon the embodiment.

The broadcast module 225 periodically determines which 3D map tiles are in active memory and sends a broadcast to the network 130, e.g. to the intermediary node 135, indicating which 3D map tiles are in active memory, or which have been added since the last broadcast. In some embodiments, the broadcast additionally indicates which 3D map tiles are not in active memory, or which 3D map tiles have been removed from active memory since the last broadcast. The broadcast may indicate particular 3D map tiles and distinguish 3D map tiles from one another using geohashes.

A geohash is a mapping of location information to an alphanumeric string. Each 3D map tile is identified by a distinct geohash. For example, a location estimate including a latitude and a longitude may be mapped to a geohash identifying a 3D map tile representing a geographic area that includes the location estimate. Mapping the latitude and longitude pair to the geohash can involve converting the latitude and longitude into binary digits, interleaving the binary digits, and converting the resultant interleaved bit string into an alphanumeric base 32 encoding.

The data store 230 stores some or all 3D map tiles. The data store 230 is non-volatile, such as a hard disk drive. Data from the data store 230 is loaded into the active memory 235 for use. The data store 230 can store a greater amount of information than active memory 235. For example, the data store 230 may include every 3D map tile, while active memory 235 can load only a subset of the 3D map tiles at any given time. In some embodiments, the data store 230 is physically and/or logically separate from the server 120 and may be accessed by the server 120 via the network 130. In some embodiments, the data store 230 is a central data store accessible by more than one server 120.

Active memory 235 is memory with quick access time, such as a form of random access memory (RAM). Active memory 235 loads data from the data store 230 for use by programs executing upon the server 120. The server's 120 active memory 235 cannot load all 3D map tiles at once from the data store 230. The server 120 may be instructed to load a particular 3D map tile and/or to overwrite a particular 3D map tile by the intermediary node 135, as detailed below.

Sticky Session Routing Layer

Figure 3:
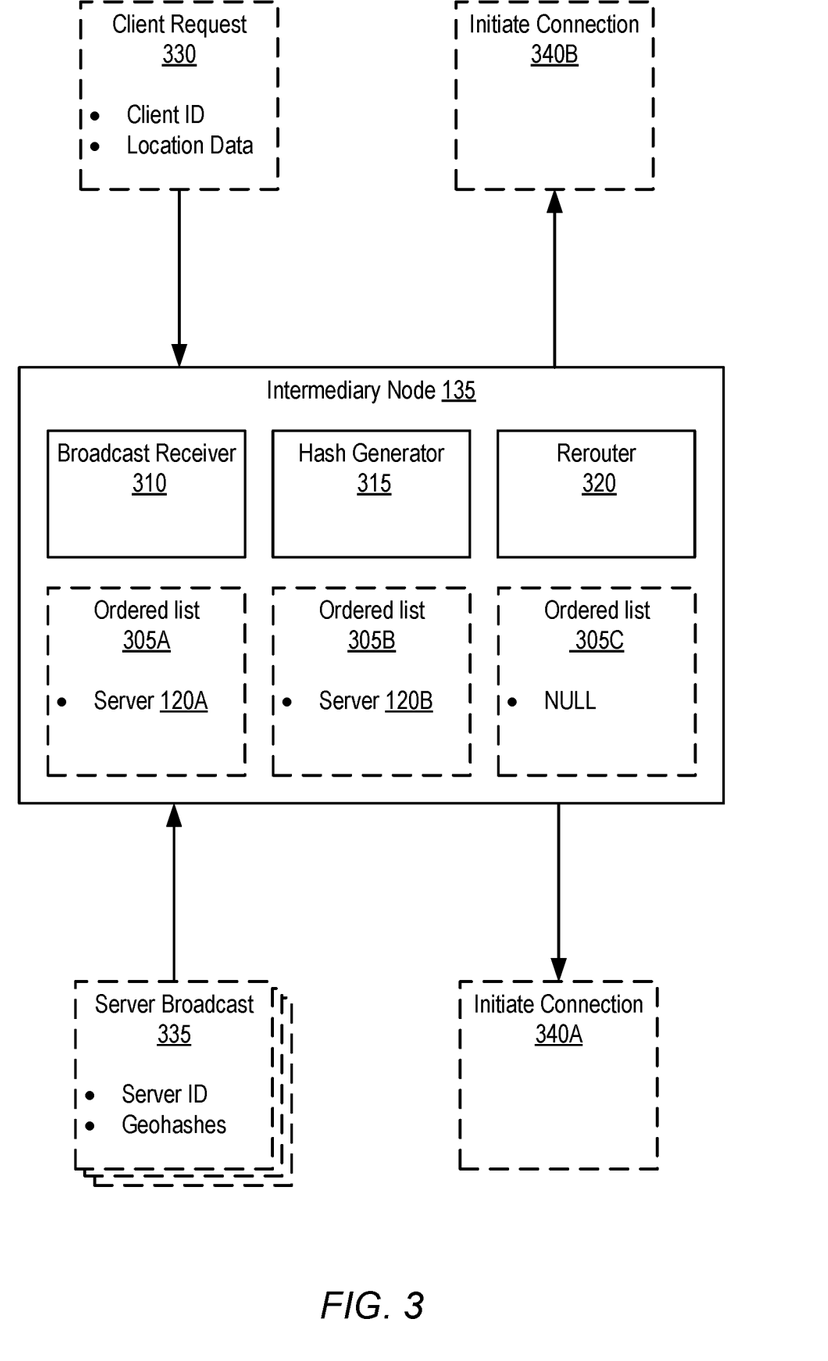
FIG. 3 is a block diagram of an intermediary node illustrating the exchange of information via the intermediary node, according to one embodiment.

FIG. 3 is a block diagram of an intermediary node 135 illustrating the exchange of information via the intermediary node 135, according to one embodiment. The intermediary node 135 includes a broadcast receiver 310, a hash generator 315, and a rerouter 320. The intermediary node 135 additionally maintains ordered lists for map tiles 305. In the embodiment of the figure, the intermediary node 135 maintains three ordered lists 305A-C, each corresponding to a different 3D map tile. Each ordered list may be indexed, e.g. accessible, by a geohash representing its corresponding 3D map tile. The intermediary node 135 is a networking node. Solid blocks in the block diagram indicate functional components, e.g. software and/or hardware, whereas blocks with dashed outlines represent data. In an embodiment, the intermediary node 135 includes both a routing node and a master server physically and/or communicatively connected to the routing node, where the master server performs one or more of the actions described herein. For example, the master server may perform one or more analyses described herein as performed by the broadcast receiver 310.

The broadcast receiver 310 receives broadcasts 335 from servers 120 and updates the ordered lists 305 based on the geohashes included in each received broadcast. For example, ordered list 305A is associated with a first 3D map tile and includes server identifier 120A. If the intermediary node 135 receives a broadcast 335 from server 120B including a geohash for the first 3D map tile, the broadcast receiver 310 updates ordered list 305A to further include a server identifier for server 120B.

The broadcast receiver 310 may also receive a client request 330 from a client 110 that includes a client identifier (client ID) and location data. The broadcast receiver 310 may use the location data to generate a client geohash. Generating the client geohash may include obtaining a location estimate for the client 110 (e.g., requesting a most recent location estimate from a server 120 that generated the location estimate for the client 110) and using the location estimate (e.g. a set of coordinates) to determine a geohash, which the broadcast receiver 310 then associates with the client 110 as a client geohash.

The broadcast receiver 310 may also analyze client requests 330, received broadcasts 335, and ordered lists 305 and, based on the analysis, perform an action, or send requests to one or more servers 120 and/or clients 110 to perform an action. In various embodiments the broadcast receiver 310 may perform various analyses for various actions.

In an embodiment, the broadcast receiver 310 performs analysis to determine whether a 3D map tile is highly used. For example, the broadcast receiver 310 may determine a number of clients 110 that are using a certain 3D map tile (e.g., clients 110 with location estimates within the geographic region represented by the 3D map tile and that have a connection with a server 120 with the 3D map tile loaded into its memory). The broadcast receiver 310 may also determine a number of servers 120 that have loaded the 3D map tile into active memory. Based on the determined number of clients 110 and the determined number of servers 120, the broadcast receiver 310 may determine a score, e.g. a ratio of the determined number of clients 110 to the determined number of servers 120. The broadcast receiver 310 may determine whether the determined score exceeds a threshold score. Based on determining that the score does exceed the threshold score, the broadcast receiver 310 identifies a least used 3D map tile, identifies a server 120 with the least-used 3D map tile in active memory, and sends a request to the identified server 120 to replace the least-used 3D map tile with the certain map tile.

In an embodiment, the broadcast receiver 310 performs analysis to determine whether a client 110 is a high speed client. For example, the broadcast receiver 310 may determine that the client 110 is a high speed client if location information received from the client 110 indicates that the client 110 moves at a speed exceeding a threshold speed, or if the client identifier associated with the client 110 is a client identifier for a high speed client. If the broadcast receiver 310 determines that a client 110 is a high speed client, the broadcast receiver 310 may identify a server 120 connected to the high speed client and send instructions to the identified server 120 to load into its active memory three-dimensional map tiles contiguous with the three-dimensional map tile representing a geographic area within which a most recent location estimate of the client 110 resides.

The broadcast receiver 310 may perform analysis to determine whether a server 120 is down, e.g. disconnected from the network 130. If the broadcast receiver 310 determines that the server 120 is down, the broadcast receiver 310 may instruct the rerouter 320 to connect clients 110 that had a network connection with the down server 120 to other servers 120.

The hash generator 315 generates hashes based on client identifiers. Depending upon the embodiment, the hash generator 315 performs rendezvous hashing, consistent hashing, or another unambiguous hashing technique that provides distributed agreement. Rendezvous hashing, for example, is a hashing technique used to select one of a set of destinations for an object. For each destination in the set of destinations, the destination and object are input to a two-parameter hash function, which outputs a score. Depending upon the embodiment, either the highest or lowest score is selected, or a score is selected from a subset of the highest (or lowest)

scores. As a specific example, a client identifier is an object, and a set of server identifiers is a set of destinations. For each server identifier, the server identifier and client identifier are hashed using the hash function to generate a score. The rendezvous hashing technique returns the server identifier associated with the highest score, e.g. sends the client identifier and the server identifier to the rerouter 320 for initiation of a network connection.

The rerouter 320 connects clients 110 and servers 120 over the network 130 and can change connections among clients 110 and servers 120, such as in response to instructions received from the broadcast receiver 310 or hash generator 315. For example, the rerouter 320 may receive a client identifier and a server identifier from the hash generator 315, and may initiate a connection between the client 110 identified by the client identifier and the server 120 identified by the server identifier. In some embodiments, responsive to receiving a request from the broadcast receiver 310 that indicates a certain server 120 is down, the rerouter 320 identifies clients 110 connected to the certain server 120, terminates the connections, and reconnects the identified clients 110 to other servers 120. For example, the rerouter 320 identifies, for each identified client 110, a 3D map tile (e.g. a 3D map tile associated with a client geohash of the identified client 110). The rerouter 320 then identifies other servers 120 with the identified 3D map tile loaded into active memory and connects the identified client 110 to the identified other server 120.

Depending upon the embodiment, the intermediary node 135 initiates a connection between a client 110 and a server 120 by sending connection information (e.g. a hostname and port) to a client 110, to a server 130, or to both the client 110 and the server 120. A person of ordinary skill in the art will recognize that other techniques to initiate a connection may be exercised.

An ordered list is a list of server identifiers, e.g. server identifiers each identifying a server 120 that has loaded into active memory a 3D map tile associated with the ordered list. The 3D map tile may be associated with the ordered list via a geohash of the 3D map tile. For example, the ordered list may be indexed or referenced by the geohash. Server identifiers within the ordered list are ordered. For example, the server identifiers may be listed in order by ascending or descending alphanumeric value. As detailed above, server identifiers may be added to or removed from the ordered list. The intermediary node 135 may maintain an ordered list for each 3D map tile (i.e., for each geohash). In the embodiment of the figure, ordered list 305A is associated with a first geohash and includes a server identifier for server 120A, ordered list 305B is associated with a second geohash and includes a server identifier for server 120B, and ordered list 305C is associated with a third geohash and includes no server identifiers (e.g., NULL).

FIG. 3 additionally illustrates various input and output to and from the intermediary node 135, such as a client request 330, several server broadcasts 335, and requests to initiate connections 340. The client request 330 is a request from a client 110 including a client identifier and location data. The request may be, for example, a request to communicate with a server 120, e.g. to prompt the server 120 to generate a location estimate based on the location data. The several server broadcasts 335 each include a server identifier and a geohash; depending upon the embodiment, there may be a singular server broadcast 335, multiple server broadcasts 335, or a server broadcast 335 for each server 120. Requests to initiate connections 340 are, as detailed above, sent to the client 110 and/or server 120 and are used to initiate a connection between the client 110 and server 120.

Routing Process

Figure 4:
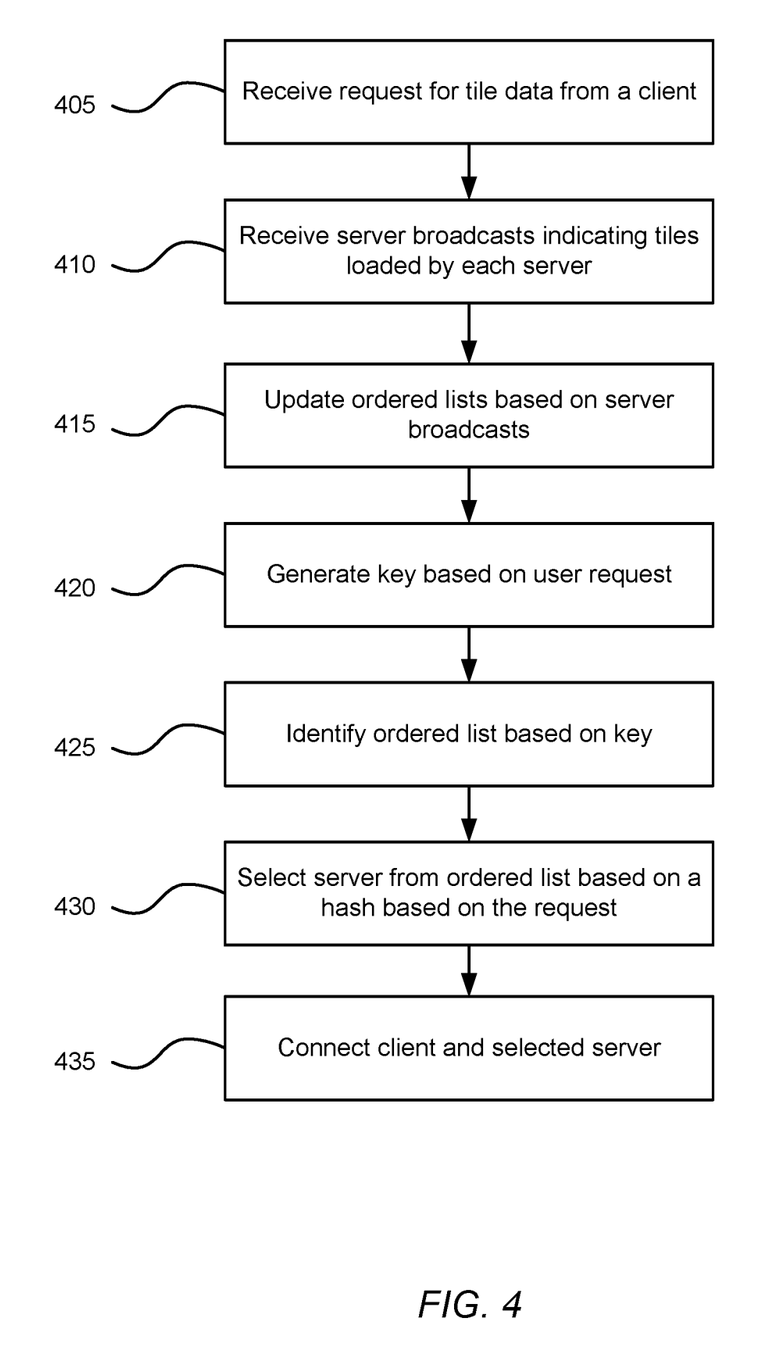
FIG. 4 is a process diagram illustrating a sticky session routing process, according to one embodiment.

FIG. 4 is a process diagram illustrating a sticky session routing process, according to one embodiment. The process of FIG. 4 shall be described with reference to entities of FIGS. 1 and 3. The intermediary node 135 receives 405 a client request 330 for 3D tile data (e.g., a request to connect to a server 120) from a client 110. The intermediary node 135 receives 410 server broadcasts 335 from servers 120, each broadcast 335 indicating (using, for example, geohashes) one or more 3D map tiles loaded into active memory by the server 120. The intermediary node 135 updates 415 its ordered lists based on the server broadcasts 335. For example, for each geohash received in a broadcast 335, the intermediary node 135 updates an ordered list indexed by (i.e., referenced by or associated with) the geohash to include the server identifier included in the broadcast 335.

The intermediary node 135 generates 420 a key (e.g., a client geohash) based on the location information included in the client request 330. The intermediary node 135 identifies 425 an ordered list based on the key. For example, the intermediary node 135 identifies an ordered list indexed by the key. The intermediary node 135 selects 430 a server identifier from the ordered list based on a hash based on the client request 330. For example, the intermediary node 135 performs rendezvous hashing with each server identifier in the ordered list and the client identifier and selects the server identifier associated with the highest hash score. The intermediary node 135 connects 435 the client 110 with the server 120 identified by the selected server identifier.

Computing Hardware

Figure 5:
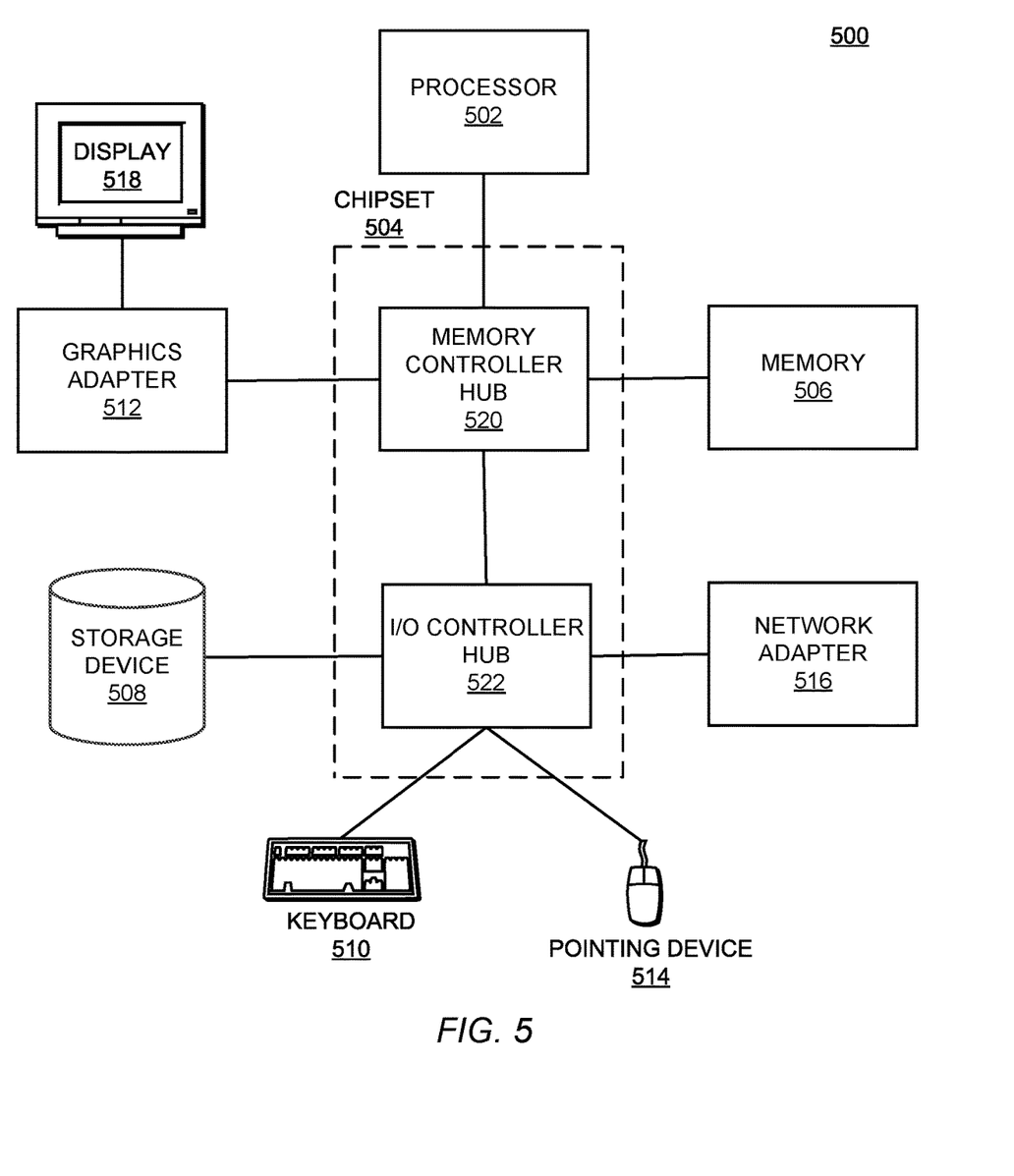
FIG. 5 is a block diagram illustrating a computer system, according to one embodiment.

The entities shown in FIG. 1 are implemented using one or more computers. FIG. 5 is a block diagram illustrating a computer system 500 for acting as a client 110 or server 120, according to one embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 500. The graphics adapter 512 displays images and other information on the display 518. The network adapter 516 couples the computer system 500 to the network 130, including the intermediary node 135.

As is known in the art, a computer 500 can have different and/or other components than those shown in FIG. 5. In addition, the computer 500 can lack certain illustrated components. For example, the computer acting as the server 120 can be formed of multiple blade servers linked together into one or more distributed systems and lack components such as keyboards and displays. Moreover, the storage device 508 can be local and/or remote from the computer 500 (such as embodied within a storage area network (SAN)).

ADDITIONAL CONSIDERATIONS

The foregoing description of the embodiments of the invention has been presented for the purpose of illustration;

it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
receiving, by an intermediary node, from each of a set of servers, a broadcast wherein the broadcast includes a plurality of geohashes, wherein each geohash indicates a three-dimensional map tile repesenting a geographic area that is loaded into the server's memory as an encoding of the location coordinates indicating the geographic area into an interleaved alphanumeric string;
for each of the received geohashes, updating, by the intermediary node, an ordered list indexed by the geohash, wherein each ordered list includes one or more server identifiers each identifying a server of the set of servers that has loaded into its memory the three-dimensional map tile corresponding to the ordered list;
receiving, at the intermediary node, from a client device, a request to connect with a server, the request including location data indicating a location of the client device and a client identifier, the client identifier distinguishing the client device from other client devices;
generating, by the intermediary node, a client geohash based on the received location data;
identifying, by the intermediary node, the ordered list in the set of ordered lists indexed by the client geohash;
selecting, by the intermediary node, a server identifier from the identified ordered list based the client identifier; and
initiating, by the intermediary node, a network connection between the client device and the server of the set of servers associated with the selected server identifier.

2. The method of claim 1, wherein selecting the server identifier from the identified ordered list based on the client identifier comprises at least one of rendezvous hashing the client identifier and consistent hashing the client identifier.

3. The method of claim 1, wherein generating the client geohash based on the received location data comprises:
obtaining, by the intermediary node, a location estimate for the client device based on the received location data, wherein the location estimate comprises a set of coordinates; and
generating, by the intermediary node, the client geohash based on the set of coordinates.

4. The method of claim 1, further comprising:
determining, by the intermediary node, a number of clients that are using a certain three-dimensional map tile;
determining, by the intermediary node, a number of servers that have loaded into memory the certain three-dimensional map tile;
determining, by the intermediary node, a score based on the determined number of clients and the determined number of servers; and
responsive to the determined score exceeding a threshold score:
identifying, by the intermediary node, a least used three-dimensional map tile;
identifying, by the intermediary node, a server of the set of servers that has in its memory the least used three-dimensional map tile; and
sending, by the intermediary node, to the identified server, a request to replace the least used three-dimensional map tile with the certain three-dimensional map tile.

5. The method of claim 1, further comprising:
determining, by the intermediary node, based on at least one received broadcast, that a first server does not include a first three-dimensional map tile that is represented by a first geohash;
identifying an ordered list indexed by the first geohash; and
removing, from the identified ordered list, a first server identifier representing the first server.

6. The method of claim 5, further comprising:
identifying, by the intermediary node, a first client device with an initiated network connection with the first server;
determining, by the intermediary node, that the first client device is associated with a first location estimate included in the first three-dimensional map tile;
selecting, by the intermediary node, a new server identifier from the identified ordered list other than the first server identifier; and
initiating, by the intermediary node, a network connection between the first client device and a server of the set of servers associated with the new server identifier.

7. The method of claim 1, further comprising:
determining, by the intermediary node, that the client device is a high speed client device; and
sending, by the intermediary node, to the server associated with the selected server identifier, instructions to load into its memory three-dimensional map tiles contiguous with the three-dimensional map tile represented by the client geohash.

8. A non-transitory computer-readable storage medium storing computer program instructions executable by a processor to perform operations, the operations comprising:
receiving, by an intermediary node, from each of a set of servers, a broadcast wherein the broadcast includes a plurality of geohashes, wherein each geohash indicates a three-dimensional map tile representing a geographic area that is loaded into the server's memory as an encoding of location coordinates indicating the geographic area into an interleaved alphanumeric string;
for each of the received geohashes, updating, by the intermediary node, an ordered list indexed by the geohash, wherein each ordered list includes one or more server identifiers each identifying a server of the set of servers that has loaded into its memory the three-dimensional map tile corresponding to the ordered list;
receiving, at the intermediary node, from a client device, a request to connect with a server, the request including location data indicating a location of the client device and a client identifier, the client identifier distinguishing the client device from other client devices;

generating, by the intermediary node, a client geohash based on the received location data;
identifying, by the intermediary node, the ordered list in the set of ordered lists indexed by the client geohash;
selecting, by the intermediary node, a server identifier from the identified ordered list based the client identifier; and
initiating, by the intermediary node, a network connection between the client device and the server of the set of servers associated with the selected server identifier.

9. The non-transitory computer-readable storage medium of claim 8, wherein selecting the server identifier from the identified ordered list based on the client identifier comprises at least one of rendezvous hashing the client identifier and consistent hashing the client identifier.

10. The non-transitory computer-readable storage medium of claim 8, wherein generating the client geohash based on the received location data comprises:
obtaining, by the intermediary node, a location estimate for the client device based on the received location data, wherein the location estimate comprises a set of coordinates; and
generating, by the intermediary node, the client geohash based on the set of coordinates.

11. The non-transitory computer-readable storage medium of claim 8, the operations further comprising:
determining, by the intermediary node, a number of clients that are using a certain three-dimensional map tile;
determining, by the intermediary node, a number of servers that have loaded into memory the certain three-dimensional map tile;
determining, by the intermediary node, a score based on the determined number of clients and the determined number of servers; and
responsive to the determined score exceeding a threshold score:
identifying, by the intermediary node, a least used three-dimensional map tile;
identifying, by the intermediary node, a server of the set of servers that has in its memory the least used three-dimensional map tile; and
sending, by the intermediary node, to the identified server, a request to replace the least used three-dimensional map tile with the certain three-dimensional map tile.

12. The non-transitory computer-readable storage medium of claim 8, the operations further comprising:
determining, by the intermediary node, based on at least one received broadcast, that a first server does not include a first three-dimensional map tile that is represented by a first geohash;
identifying, by the intermediary node, an ordered list indexed by the first geohash; and
removing, by the intermediary node, from the identified ordered list, a first server identifier representing the first server.

13. The non-transitory computer-readable storage medium of claim 12, the operations further comprising:
identifying, by the intermediary node, a first client device with initiated network connections with the first server;
determining, by the intermediary node, that the first client device is associated with a first location estimate included in the first three-dimensional map tile;
selecting, by the intermediary node, a new server identifier from the identified ordered list other than the first server identifier; and
initiating, by the intermediary node, a network connection between the first client device and a server of the set of servers associated with the new server identifier.

14. The non-transitory computer-readable storage medium of claim 8, the operations further comprising:
determining, by the intermediary node, that the client device is a high speed client device; and
sending, by the intermediary node, to the server associated with the selected server identifier, instructions to load into its memory three-dimensional map tiles contiguous with the three-dimensional map tile represented by the client geohash.

15. A system comprising:
a processor for executing computer program instructions; and
a non-transitory computer-readable storage medium storing computer program instructions executable by the processor to perform operations, the operations comprising:
receiving, by an intermediary node, from each of a set of servers, a broadcast wherein the broadcast includes a plurality of geohashes, wherein each geohash indicates a three-dimensional map tile representing a geographic area that is loaded into the server's memory as an encoding of location coordinates indicating the geographic area into an interleaved alphanumeric string;
for each of the received geohashes, updating, by the intermediary node, an ordered list indexed by the geohash, wherein each ordered list includes one or more server identifiers each identifying a server of the set of servers that has loaded into its memory the three-dimensional map tile corresponding to the ordered list;
receiving, at the intermediary node, from a client device, a request to connect with a server, the request including location data indicating a location of the client device and a client identifier, the client identifier distinguishing the client device from other client devices;
generating, by the intermediary node, a client geohash based on the received location data;
identifying, by the intermediary node, the ordered list in the set of ordered lists indexed by the client geohash;
selecting, by the intermediary node, a server identifier from the identified ordered list based the client identifier; and
initiating, by the intermediary node, a network connection between the client device and the server of the set of servers associated with the selected server identifier.

16. The system of claim 15, wherein selecting the server identifier from the identified ordered list based on the client identifier comprises at least one of rendezvous hashing the client identifier and consistent hashing the client identifier.

17. The system of claim 15, wherein generating the client geohash based on the received location data comprises:
obtaining, by the intermediary node, a location estimate for the client device based on the received location data, wherein the location estimate comprises a set of coordinates; and
generating, by the intermediary node, the client geohash based on the set of coordinates.

18. The system of claim 15, the operations further comprising:

determining, by the intermediary node, based on at least one received broadcast, that a first server does not include a first three-dimensional map tile that is represented by a first geohash;

identifying, by the intermediary node, an ordered list indexed by the first geohash; and removing, by the intermediary node, from the identified ordered list, a first server identifier representing the first server.

19. The system of claim 18, the operations further comprising:

identifying, by the intermediary node, a first client device with initiated network connections with the first server;

determining, by the intermediary node, that the first client device is associated with a first location estimate included in the first three-dimensional map tile;

selecting, by the intermediary node, a new server identifier from the identified ordered list other than the first server identifier; and initiating, by the intermediary node, a network connection between the first client device and a server of the set of servers associated with the new server identifier.

20. The system of claim 15, the operations further comprising:

determining, by the intermediary node, that the client device is a high speed client device; and sending, by the intermediary node, to the server associated with the selected server identifier, instructions to load into its memory three-dimensional map tiles contiguous with the three-dimensional map tile represented by the client geohash.

* * * * *

UNITED STATES PATENT AND TRADEMARK OFFICE
CERTIFICATE OF CORRECTION

PATENT NO. : 10,681,120 B2
APPLICATION NO. : 16/045665
DATED : June 9, 2020
INVENTOR(S) : Iland et al.

Page 1 of 1

It is certified that error appears in the above-identified patent and that said Letters Patent is hereby corrected as shown below:

In the Claims

In Column 9, Claim 1, Line 22, delete "repesenting" and insert --representing--, therefor.

Signed and Sealed this
Twenty-ninth Day of December, 2020

Andrei Iancu
*Director of the United States Patent and Trademark Office*